United States Patent [19]

Jauneaud

[11] 3,938,472

[45] Feb. 17, 1976

[54] EGG INCUBATOR OF THE TUNNEL TYPE

[75] Inventor: Francois Jauneaud, Indre-et-Loire, France

[73] Assignee: Bekoto, Indre-et-Loire, France

[22] Filed: July 8, 1974

[21] Appl. No.: 486,429

[30] Foreign Application Priority Data
July 12, 1973  France .................................. 73.25662

[52] U.S. Cl. ..................................... 119/37; 119/44
[51] Int. Cl.² ......................................... A01K 41/00
[58] Field of Search ......................... 119/37, 42, 44

[56] References Cited
UNITED STATES PATENTS

| | | | |
|---|---|---|---|
| 1,820,311 | 8/1931 | Lackie | 119/42 |
| 2,997,021 | 8/1961 | Bailey | 119/37 |
| 3,147,738 | 9/1964 | Theilig | 119/44 X |

Primary Examiner—Hugh R. Chamblee
Attorney, Agent, or Firm—Karl W. Flocks

[57] ABSTRACT

The invention relates to an egg incubator of the tunnel type comprising an entrance at one end and an outlet at the other and two sets of rails receiving two rows of trolleys carrying egg drawers which tip under the action of tilting parallelograms.

According to the invention, two sliding panels fitted with fans are each placed opposite a different row of trolleys, one at the entrance end, the other at the outlet end, in such manner as to create a longitudinal flow of stirring air, reversed by displacement of the panels during each charging or discharging.

8 Claims, 7 Drawing Figures

EGG INCUBATOR OF THE TUNNEL TYPE

The present invention relates to an egg incubator of the tunnel type comprising an entrance at one end and an outlet at the other and two sets of rails receiving two rows of trolleys carrying egg drawers which tip under the action of tilting parallelograms.

According to the invention, two sliding panels fitted with fans are each placed opposite a different row of trolleys, one at the entrance end, the other at the outlet end, in such manner as to create a longitudinal flow of stirring air, reversed by displacement of the panels during each charging or discharging.

Each panel then changes its row in order to permit passage, and especially in order to reverse the direction of the flow of air so as to make the temperatures uniform and also to modify the blowing conditions on the first eggs.

The tilting parallelograms are preferably mounted on the trolleys in such manner that only the edges of the drawers oppose the original flow.

A forward movement mechanism of the trolleys is provided at the entrance end of the incubator for each of the rows of trolleys, so that these rows can be controlled separately.

Two tilting rakes with conjoint operation, are provided for a unit comprising two trolleys on one row and two other trolleys (adjacent the first) on the other row, these rakes being intended to actuate forks fixed to the tilting parallelograms of the egg drawers.

This unit is repeated several times in the machine, with two electro-mechanical controls having a synchronized action.

Other characteristic features and advantages of the present invention will be brought out in the description which follows below, reference being made to the accompanying drawings in which.

Figure 1:
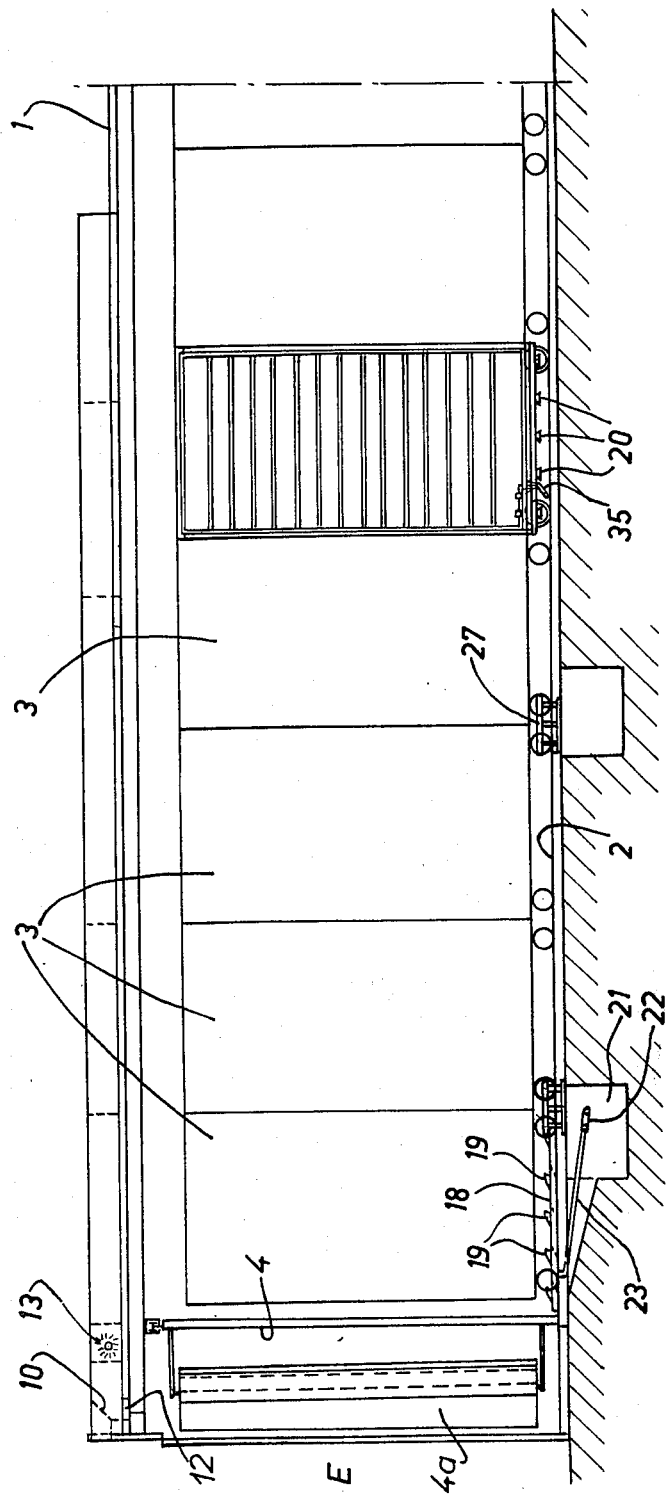
FIG. 1 is a view in partial longitudinal section of an egg incubator in accordance with the invention.
Figure 2:
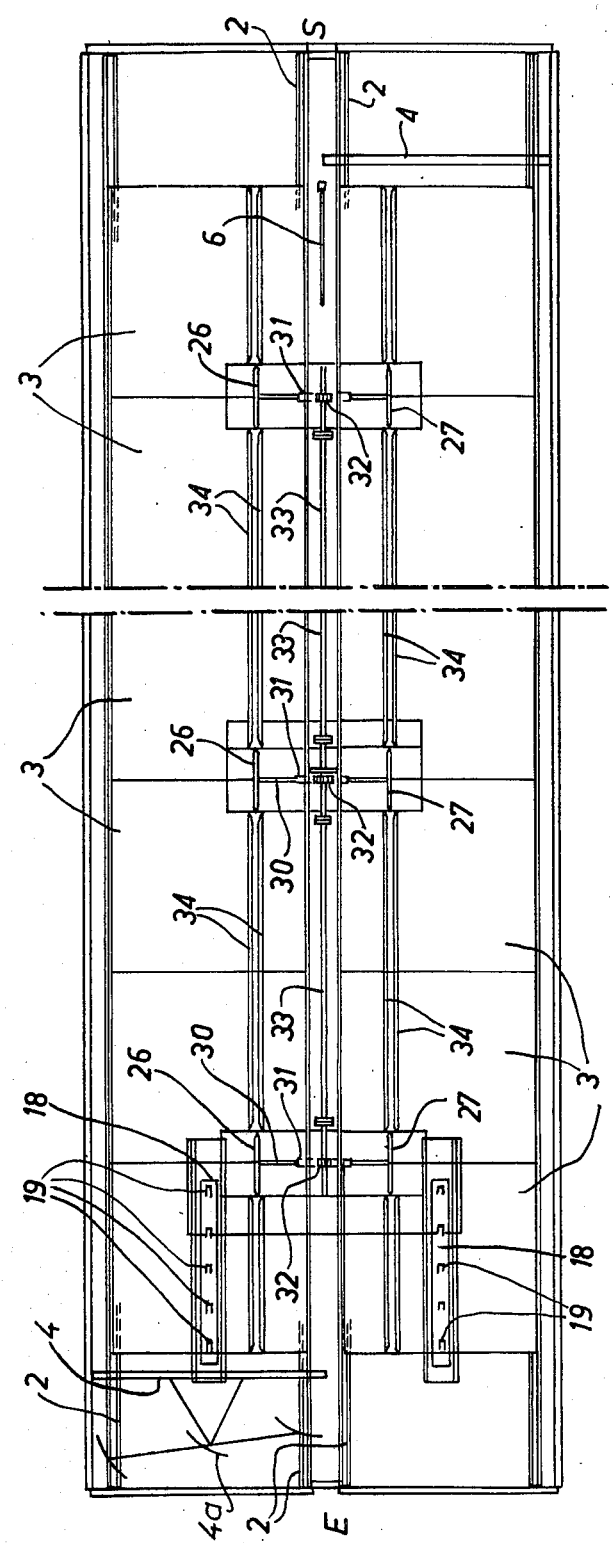
FIG. 2 is a partial view in plan of this incubator.
Figure 3:
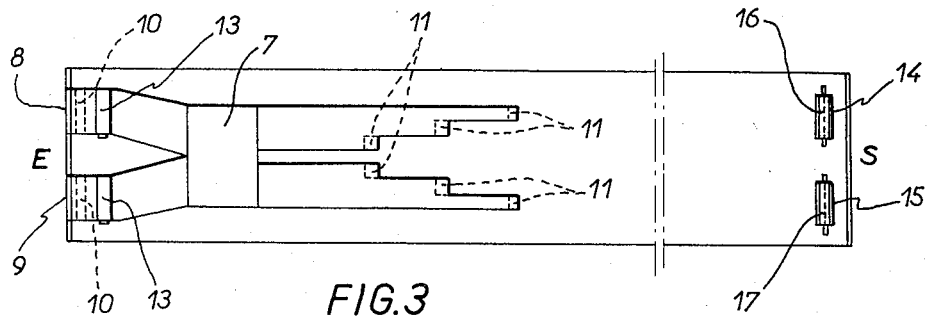
FIG. 3 is a view looking on the top of the incubator.

In the form of embodiment shown, an egg incubator of the tunnel type 1 according to the invention comprises an entry E at one end and an outlet S at the other, and two sets of rails 2 which receive trolleys 3 carrying egg drawers.

Two sliding panels 4, equipped with helicoidal fans 5 are each placed opposite a different row of trolleys, one at the extremity E and the other at the extremity S, in order to create a longitudinal flow of circulating air.

The direction of the flow may be reversed by simply sliding the panels 4, each panel then changing its row.

Deflector-coolers 4a can then be hung on the panels and during the changing of direction a set of rails reverses their position.

One or more movable curtains 6 hung in the longitudinal axis of the tunnel form two passages, in each of which is established the longitudinal flow, in the direction E-S for one passage and in the direction S-E for the other passage.

The panel 4 of the extremity S is also moved so as to permit separate forward movement of one or the other of the rows of trolleys.

The incubator comprises an aerator-conditioner-humidifier system 7 having two inlets 8 and 9 with regulating shutters 10 at the extremity E, and a number of distribution orifices 11 distributed in the central portion of the incubator. The inlets with automatic shutters are dependent on the heating operation and actuate the regulation of the humidity conditioner so as to obtain a heat-regulating effect by supplying a greater or less amount of heat. A re-cycling opening 12 provided on the upstream side of the turbine 13 of the system permits a powerful additional stirring effect to be obtained and permits the conditioner to work with humid air up to its normal rate.

Two pre-regulated outlets of air 14 and 15 with controlled shutters 16 and 17 so as to provide a larger air outlet in case of need, are provided at the extremity S of the incubator. Only the outlet which faces the row of trolleys which remains free can operate; the other outlet which faces the other row with the interposition of the panel 4 with its fans 5, is necessarily closed in order to prevent a return of air by depression. The panel itself effects the closure of one or the other of the shutters 16 and 17.

A forward movement mechanism for the trolleys is provided at the entrance E of the incubator for each of the two rows of trolleys, so that these rows can be operated separately.

Each advance mechanism comprises a rod 18 carrying pawls 19 which engage in teeth 20 fixed under the trolleys. The rod 18 is given a to-and-fro movement, so that in the direction E-S, the pawls 19 drive the teeth 20 while in the opposite direction S-E, the pawls are withdrawn. The rod is actuated by a motor speed-reduction set 21 by means of a crank-handle 22 and a crank-arm 23.

The trolleys carry the egg drawers which can tilt under the action of a control comprising parallelograms 24 and 25 coupled to each other and mounted on the trolleys in such manner that only the edge of the drawer is opposed to the longitudinal circulation flow. There is thus obtained a constant section of passage with a minimum loss of pressure and in consequence a fairly high speed of passage in order to render the temperatures homogeneous.

Two tilting rakes 26 and 27 with a single control are provided for a unit comprising two trolleys on one row and two other trolleys (adjacent the first) on the other row. These rakes are intended to actuate forks which are rigidly fixed on the parallelograms.

The trolleys are each provided with two front forks 28 and two rear forks 29, only one of those located towards the interior close to the curtain being utilized every time.

The presence of the two other forks enables the trolleys to be utilized indifferently on one or the other row of trolleys.

The rake 26 actuates the right-hand rear fork of a trolley and the right-hand front fork of the trolley which follows immediately in the left-hand row of trolleys.

The rake 27 actuates the left-hand rear fork of a trolley and the left-hand front fork of the trolley immediately following in the right-hand row of trolleys.

The conjoint control of the two rakes 26 and 27 is constituted by a rod 30 carrying a toothed rack 31 in engagement with a pinion 32.

At the same time as they pivot, the forks slide on the rakes, which makes it possible to obtain a maximum torque on the parallelograms for the same force at the toothed rack.

There exist several pairs of rakes 26 and 27 over the travel of the trolleys, and the various pinions 32 can be given a common control 33.

In order to change the tilting rakes, the forks of the trolleys are guided externally by guides 34. A device 35 for locking on the horizontal, acting on one of the parallelograms of the trolley, is provided in order to keep the drawers horizontal as soon as the trolley leaves the rails.

In the machine, this locking is annulled since the external guides of the forks are superimposed on the tilting rakes and therefore the forks cannot tilt.

The charging or discharging is effected by means of a vane conveyor and it is possible, in order to make this operation automatic, to provide a conveyor on the ground, following the complete circuit of the trolleys (egg compartment, incubator, transfer, washing, disinfection, return to the egg compartment).

The regulation of temperature is located close to the ventilator panels in order to be accessible; this is also the case for the heating elements.

Finally, the fans may of course be utilized as suction devices.

Figure 6:
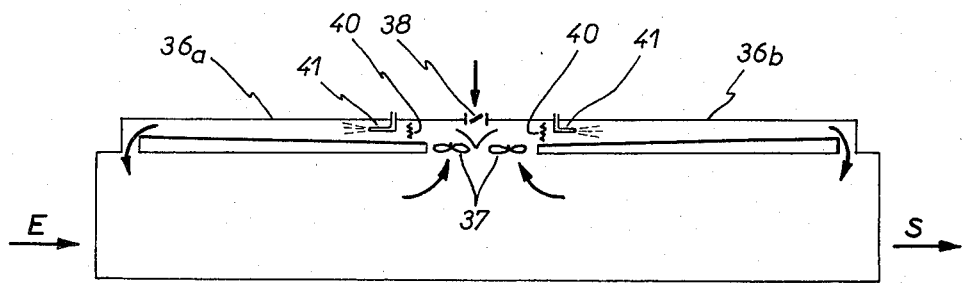
FIGS. 6 and 7 show in elevation and plan view respectively, an alternative form of construction of the aerator-conditioner-humidifier system.
Figure 7:
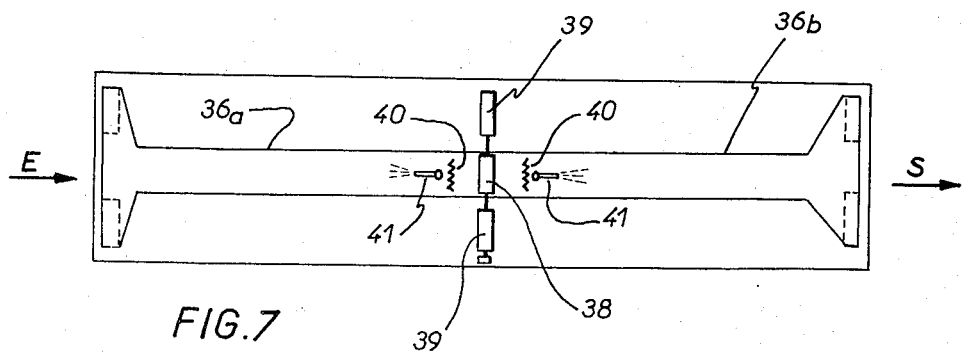
Figure 5:
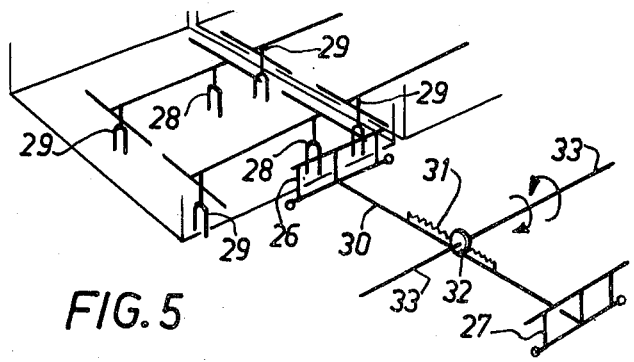
FIG. 5 is a diagram showing partially and in perspective the overturning control of the egg drawers.
Figure 4:
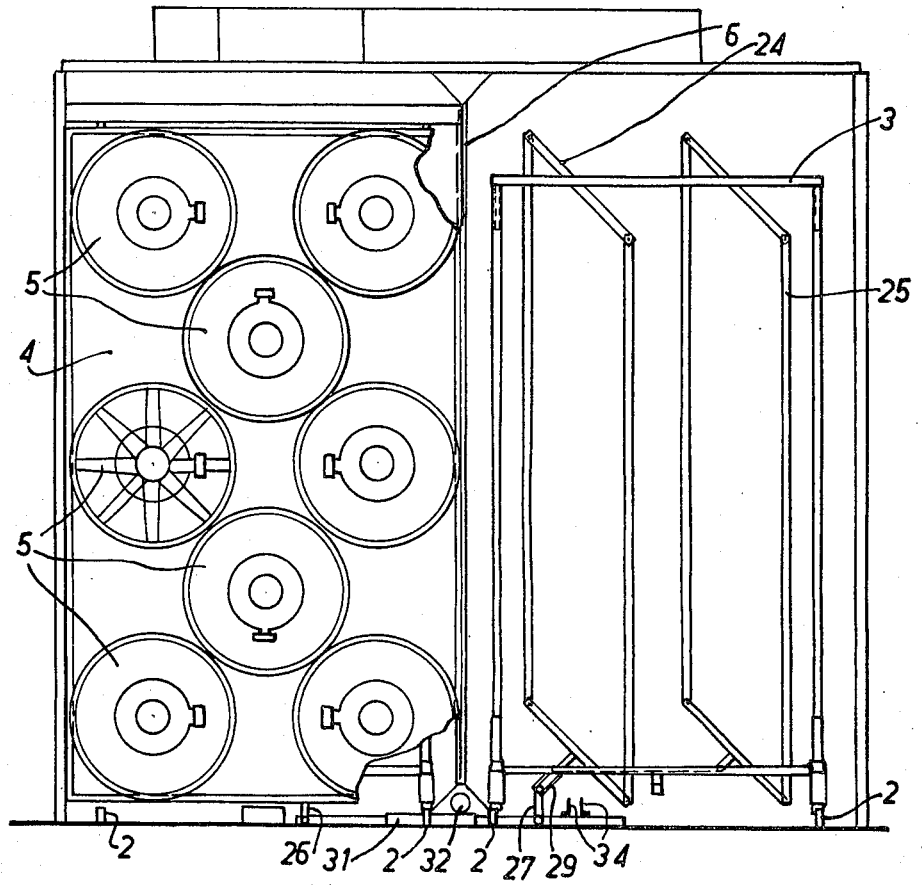
FIG. 4 is a view in elevation and to a larger scale, taken at one of the extremities of the incubator.

In accordance with an alternative form shown in FIGS. 6 and 7, the aerator-conditioner-humidifier system comprises a longitudinal duct in two sections 36a and 36b, enabling the ambient air taken from the centre of the machine to be re-cycled and injected at the extremities. Extractors 37 push the air in each section and the depression created by these extractors permits fresh air to be drawn-in. The quantity of this fresh air is regulated by a shutter 38 synchronized with the air-outlet shutters 39 and driven by a servo-motor which is in turn actuated towards closure or opening by the operation or non-operation of the relay of a front heating device.

In each section, front and rear, a heating section 40 and a spraying section 41 bring the re-cycled fresh air to the desired conditions of temperature and percentage humidity.

The percentage humidity is controlled by a single hygrostat, so that only the temperature of this moist air aids the regulation.

This temperature is therefore limited at a maximum by the various thermometers between the front and the rear, depensing on the position of the air-inlet shutter and which permit the injection of moist air which is colder at the rear than at the front (the eggs placed in the rear portion of the machine give-up heat while those located in the first half of the machine absorb heat).

I claim:

1. In an egg incubator of the tunnel type comprising an inlet chamber at one end and an outlet chamber at the other and two sets of parallel rails adapted to receive two rows of trolleys carrying egg drawers which tip under the action of tilting parallelograms, two sliding panels equipped with fans, each placed opposite a different row of trolleys, one at the inlet chamber, the other at the outlet chamber so as to create a longitudinal flow of circulating air capable of being reversed by changing the positions of the panels, each panel then changing its row, at least one curtain forming two passages in each of which said longitudinal flow of air is established, the tilting parallelograms being mounted on said trolleys in such manner that only the edge of the drawers opposes said longitudinal flow of air thus obtaining a constant section of passage with a minimum loss of pressure and in consequence a fairly high speed of passage in order to render the temperatures homogeneous.

2. An incubator as claimed in claim 1, and further comprising an aerator-conditioner-humidifier system including two sections enabling the ambient air to be re-cycled from the centre towards the extremities, so that a thermal compensation is obtained between the front and the rear of said incubator, the effect of cold induced by spraying of water attenuating the supply of heat from the eggs themselves at the end of the incubation period.

3. In an egg incubator of the tunnel type comprising an inlet chamber at one end and an outlet chamber at the other and two sets of parallel rails adapted to receive two rows of trolleys carrying egg drawers which tip under the action of tilting parallelograms, two sliding panels equipped with fans, each placed opposite a different row of trolleys, one at the inlet chamber, the other at the outlet chamber so as to create a longitudinal flow of circulating air capable of being reversed by changing the positions of the panels, each panel then changing its row, at least one curtain forming two passages in each of which said longitudinal flow of air is established, the tilting parallelograms being mounted on said trolleys in such manner that only the edge of the drawers opposes said longitudinal flow of air thus obtaining a constant section of passage with a minimum loss of pressure and in consequence a fairly high speed of passage in order to render the temperatures homogeneous, an aerator-conditioner-humidifier system including at least one automatic shutter inlet controlled by the heating function and actuating the regulation of the conditioner located at the inlet of said incubator, and a plurality of distribution orifices distributed in the central portion of said incubator, a re-cycling opening being provided upstream of a turbine included in said system.

4. In an egg incubator of the tunnel type comprising an inlet chamber at one end and an outlet chamber at the other and two sets of parallel rails adapted to receive two rows of trolleys carrying egg drawers which tip under the action of tilting parallelograms, two sliding panels equipped with fans, each placed opposite a different row of trolleys, one at the inlet chamber, the other at the outlet chamber so as to create a longitudinal flow of circulating air capable of being reversed by changing the positions of the panels, each panel then changing its row, at least one curtain forming two passages in each of which said longitudinal flow of air is established, the tilting parallelograms being mounted on said trolleys in such manner that only the edge of the drawers opposes said longitudinal flow of air thus obtaining a constant section of passage with a minimum loss of pressure and in consequence a fairly high speed of passage in order to render the temperatures homogeneous, two preregulated shutter outlets provided at the outlet of said incubator, the outlet facing the row of trolleys in front of which the panel carrying fans is placed being closed by its shutter, said fan-carrying panel effecting itself the closure of said shutter.

5. In an egg incubator of the tunnel type comprising an inlet chamber at one end and an outlet chamber at the other and two sets of parallel rails adapted to receive two rows of trolleys carrying egg drawers which tip under the action of tilting parallelograms, two sliding panels equipped with fans, each placed opposite a different row of trolleys, one at the inlet chamber, the other at the outlet chamber so as to create a longitudinal flow of circulating air capable of being reversed by changing the positions of the panels, each panel then changing its row, at least one curtain forming two passages in each of which said longitudinal flow of air is established, the tilting parallelograms being mounted on said trolleys in such manner that only the edge of the drawers opposes said longitudinal flow of air thus obtaining a constant section of passage with a minimum loss of pressure and in consequence a fairly high speed of passage in order to render the temperatures homogeneous, an advance mechanism for said trolleys provided at the inlet of said incubator for each of the two rows of trolleys, so that these rows may be separately operated.

6. In an egg incubator of the tunnel type comprising an inlet chamber at one end and an outlet chamber at the other and two sets of parallel rails adapted to receive two rows of trolleys carrying egg drawers which tip under the action of tilting parallelograms, two sliding panels equipped with fans, each placed opposite a different row of trolleys, one at the inlet chamber, the other at the outlet chamber so as to create a longitudinal flow of circulating air capable of being reversed by changing the positions of the panels, each panel then changing its row, at least one curtain forming two passages in each of which said longitudinal flow of air is established, the tilting parallelograms being mounted on said trolleys in such manner that only the edge of the drawers opposes said longitudinal flow of air thus obtaining a constant section of passage with a minimum loss of pressure and in consequence a fairly high speed of passage in order to render the temperatures homogeneous, an advance mechanism for said trolleys provided at the inlet of said incubator for each of the two rows of trolleys, so that these rows can be separately operated, each advance mechanism comprising teeth fixed under the trolleys, a rod to which is given a to-and-fro movement and which carries pawls coming into engagement with said teeth fixed under the trolleys.

7. In an egg incubator of the tunnel type comprising an inlet chamber at one end and an outlet chamber at the other and two sets of parallel rails adapated to receive two rows of trolleys carrying egg drawers which tip under the action of tilting parallelograms, two sliding panels equipped with fans, each placed opposite a different row of trolleys, one at the inlet chamber, the other at the outlet chamber so as to create a longitudinal flow of circulating air capable of being reversed by changing the positions of the panels, each panel then changing its row, at least one curtain forming two passages in each of which said longitudinal flow of air is established, the tilting parallelograms being mounted on said trolleys in such manner that only the edge of the drawers opposes said longitudinal flow of air, thus obtaining a constant section of passage with a minimum loss of pressure and in consequence a fairly high speed of passage in order to render the temperatures homogeneous, forks rigidly fixed to the tilting parallelograms of the egg drawers, a plurality of pairs of rakes with conjoint operations provided on the path of said trolleys in order to actuate said forks, each pair of rakes being adapted to actuate the forks of a unit comprising two trolleys on one row and two other trolleys (in the vicinity of the first) on the other row, guiding devices being provided on said forks in order to change the actuating rakes during the forward movement of said trolleys.

8. In an egg incubator of the tunnel type comprising an inlet chamber at one end and an outlet chamber at the other and two sets of parallel rails adapted to receive two rows of trolleys carrying egg drawers which tip under the action of tilting parallelograms, two sliding panels equipped with fans, each placed opposite a different row of trolleys, one at the inlet chamber, the other at the outlet chamber so as to create a longitudinal flow of circulating air capable of being reversed by changing the positions of the panels, each panel then changing its row, at least one curtain forming two passages in each of which said longitudinal flow of air is established, the tilting parallelograms being mounted on said trolleys in such manner that only the edge of the drawers opposes said longitudinal flow of air thus obtaining a constant section of passage with a minimum loss of pressure and in consequence a fairly high speed of passage in order to render the temperatures homogeneous, and cooling devices, which simultaneously operate as air deflectors, are moved with said panels.

* * * * *